(12) United States Patent
Schoenfeld et al.

(10) Patent No.: US 12,437,382 B2
(45) Date of Patent: Oct. 7, 2025

(54) DEVICE AND COMPUTER-IMPLEMENTED METHOD FOR EVALUATING A CONTROL OF A GENERATOR FOR DETERMINING PIXELS OF A SYNTHETIC IMAGE

(71) Applicant: Robert Bosch GmbH, Stuttgart (DE)

(72) Inventors: Edgar Schoenfeld, Tuebingen (DE); Anna Khoreva, Stuttgart (DE); Julio Borges, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 250 days.

(21) Appl. No.: 18/313,273

(22) Filed: May 5, 2023

(65) Prior Publication Data

US 2023/0386004 A1 Nov. 30, 2023

(30) Foreign Application Priority Data

May 27, 2022 (EP) .................................. 22175795

(51) Int. Cl.
*G06V 20/70* (2022.01)
*G06T 7/00* (2017.01)
*G06T 11/00* (2006.01)
*G06V 10/74* (2022.01)

(52) U.S. Cl.
CPC ............ *G06T 7/0002* (2013.01); *G06T 11/00* (2013.01); *G06V 10/761* (2022.01); *G06V 20/70* (2022.01); *G06T 2207/30168* (2013.01)

(58) Field of Classification Search
None
See application file for complete search history.

(56) References Cited

U.S. PATENT DOCUMENTS

| | | | | |
|---|---|---|---|---|
| 2019/0392304 A1* | 12/2019 | Aliper | ..................... | G16B 40/20 |
| 2020/0210755 A1* | 7/2020 | Luongo | ................... | G06N 20/00 |
| 2022/0138897 A1* | 5/2022 | Singh | ...................... | G06T 3/147 |
| | | | | 382/159 |
| 2022/0261658 A1* | 8/2022 | Souly | ..................... | G06N 3/045 |

(Continued)

OTHER PUBLICATIONS

Zhan et al. "Multimodal Image Synthesis and Editing: A Suvery" arXiv (2022); pp. 1-27.

(Continued)

*Primary Examiner* — Joni Hsu
(74) *Attorney, Agent, or Firm* — NORTON ROSE FULBRIGHT US LLP

(57) ABSTRACT

A device and method for evaluating a control of a generator for determining pixels of a synthetic image. The generator determining pixels of the synthetic image from a first input comprising a label map and a first latent code. The method includes providing the label map and latent code which includes input data points in a latent space; providing the control including a set of directions for moving the latent code in the latent space, determining the first latent code depending on at least one input data point of the latent code that is moved in a first direction which is selected from the set of directions, determining a distance between at least one pair of synthetic images generated by the generator for different first inputs which comprise the label map and vary by the first direction that is selected for determining the first latent code from the latent code.

9 Claims, 6 Drawing Sheets

(56) References Cited

U.S. PATENT DOCUMENTS

2023/0053588 A1* 2/2023 Li ........................ G06V 10/52
2023/0351566 A1* 11/2023 Jeon ..................... G06V 10/513

OTHER PUBLICATIONS

Liu et al. "ISF-GAN: An Implicit Style Function for High-Resolution Image-to-Image Translation" arXiv (2021); pp. 1-12.
Ling et al. "EditGAN: High-Precision Semantic Image Editing" arXiv (2021); pp. 1-38.
Pavllo et al. "Controlling Style and Semantics in Weakly-Supervised Image Generation" arXiv (2019); pp. 1-15.
Wang et al. "High-Resolution Image Synthesis and Semantic Manipulation with Conditional GANs" IEEE (2018); pp. 8798-8807.
Sushko et al. "You Only Need Adversarial Supervision for Semantic Image Synthesis" arXiv (2021); pp. 1-32.
Harkonen et al. "GANSpace: Discovering Interpretable GAN Controls" arXiv (2020); pp. 1-29.
Zhang et al. "The Unreasonable Effectiveness of Deep Features as a Perceptual Metric" arXiv (2018); pp. 1-14.
Wang et al. "Multi-Scale Structural Similarity for Image Quality Assessment" IEEE (2003); pp. 1398-1402.
Simonyan et al. "Very Deep Convolutional Networks for Large-Scale Image Recognition" arXiv (2015); pp. 1-14.
Park et al. "Semantic Image Synthesis with Spatially-Adaptive Normalization" arXiv (2019); pp. 1-19.
Heusel et al. "GANs Trained by a Two Time-Scale Update Rule Converge to a Local Nash Equilibrium" arXiv (2018); pp. 1-38.

* cited by examiner

DEVICE AND COMPUTER-IMPLEMENTED METHOD FOR EVALUATING A CONTROL OF A GENERATOR FOR DETERMINING PIXELS OF A SYNTHETIC IMAGE

CROSS REFERENCE

The present application claims the benefit under 35 U.S.C. § 119 of German Patent Application No. EP 22 17 5795.8 filed on May 27, 2022, which is expressly incorporated herein by reference in its entirety.

BACKGROUND INFORMATION

Semantic image synthesis, SIS, transforms user-specified semantic layouts to realistic images. Its applications range widely from image editing and content creation to synthetic data augmentation, where training data is generated to fulfill specific semantic requirements.

Generative Adversarial Networks, GANs, are a tool for SIS. Schönfeld, E., Sushko, V., Zhang, D., Gall, J., Schiele, B., Khoreva, A.' "You only need adversarial supervision for semantic image synthesis;" in: International Conference on Learning Representations (ICLR) (2020) discloses an example of synthesis of images and their alignment to input semantic label maps with high visual quality.

It is desirable to control the synthesis process of semantic classes specified in a lable map with GAN-based SIS models to allow a user to perform targeted local edits of a specific class in an image that is generated by the GAN-based SIS model.

Evaluations of GAN controls may be based on visual inspection. Härkönen, E., Hertzmann, A., Lehtinen, J., Paris, S.' "Ganspace: Discovering interpretable gan controls;" in: Advances in Neural Information Processing Systems (NeurIPS) (2020) discloses an example for such inspection.

It is desirable, to have a metric for evaluating GAN controls instead of visual inspection.

SUMMARY

The present invention concerns a good generator control discovery method that finds latent directions as controls that differ significantly from each other and are consistent under different initial latent code conditions.

According to an example embodiment of the present invention, the device and the computer-implemented method for evaluating generator controls comprises providing a metric to evaluate an effectiveness of a generator control discovery method and determining the metric.

According to an example embodiment of the present invention, the computer-implemented method for evaluating a control of a generator for determining pixels of a synthetic image wherein the generator is configured to determine pixels of the synthetic image from a first input comprising a label map and a first latent code, wherein the label map comprises a mapping of at least one class to at least one of the pixels, wherein the method comprises providing the label map and latent code, wherein the latent code comprises input data points in a latent space, providing the control, wherein the control comprises a set of directions for moving the latent code in the latent space, determining the first latent code depending on at least one input data point of the latent code that is moved in a first direction, wherein the first direction is selected from the set of directions, determining a distance between at least one pair of synthetic images, which are generated by the generator for different first inputs, wherein the different first inputs comprise the label map and vary by the first direction that is selected for determining the first latent code from the latent code. This distance provides a diversity score. A high diversity score implies that each discovered latent direction changes an appearance of a generated synthetic image in a uniquely different way.

According to an example embodiment of the present invention, the first input may comprise a class mask, wherein the class mask indicates the input data points to be moved in the first direction for a class, and the distance is determined depending on pixels of the synthetic images indicated by the class mask to be considered.

According to an example embodiment of the present invention, the method may comprise determining the distance between pairs of a synthetic image, which is generated with the label map and unmoved latent code, and a synthetic image, which is generated with the label map and latent code, which is moved with the first direction. This distance provides a disentanglement score. A low disentanglement score means good disentanglement properties of the GAN control discovery method.

According to an example embodiment of the present invention, the method may comprise determining the distance between pairs of synthetic images that are generated with the same label map and first direction and with varying latent code. A low consistency score implies that each class edits introduce consistent changes in an area of the synthetic image indicated by the class mask.

According to an example embodiment of the present invention, the method may comprise determining an average of distances determined for different pairs, in particular determining a mean over these distances.

According to an example embodiment of the present invention, the method may comprise determining distances for at least one class of the classes that the label map comprises and the average depending on the distances for the at least one class.

According to an example embodiment of the present invention, the method may comprise synthesizing a plurality of the synthetic images with the same label map and testing a robustness or functionality of an application for processing digital images depending on distances or scores that are determined for the plurality of the synthetic images.

According to an example embodiment of the present invention, the label map may be determined to emulate a digital image output of an image sensor, in particular a video, radar, LiDAR, ultrasonic, motion or thermal image sensor, wherein a control signal for a computer-controlled machine, in particular a robot, preferably a vehicle or a vehicle for autonomous driving, a domestic appliance, a power tool a manufacturing machine, a personal assistant, a device for automatic optical inspection, or an access system, is determined by a model depending on the synthetic image, in particular a model comprising an object detector configured for detecting objects in the synthetic image, or a classifier configured for classifying the synthetic image or objects in the synthetic image, or a segmenter, configured for segmenting the synthetic image, and wherein the model is trained depending on the synthetic image to determine the control signal and/or determining the label map and/or a selected first direction from the set of directions from user input detected by a graphical user interface, wherein a synthetic image is determined depending on the label map and/or latent code that is moved in the selected first direction and output by a display, in particular of the graphical user interface.

According to an example embodiment of the present invention, the device for evaluating a control of a generator for determining pixels of a synthetic image comprises at least one processor and at least one memory wherein the at least one memory is configured to store computer-readable instructions that when executed by the at least one processor cause the device to execute steps of the method according to one of the above-described methods and wherein the at least one processor is configured to execute the instructions.

A computer program according to an example embodiment of the present invention may comprise computer-readable instructions that when executed by a computer cause the computer to perform the steps of the method of the present invention. This computer program has advantages that correspond to the advantages of the method of the present invention.

Further embodiments of the present invention are derived from the following description and the figures.

DETAILED DESCRIPTION OF EXAMPLE EMBODIMENTS

Figure 1:
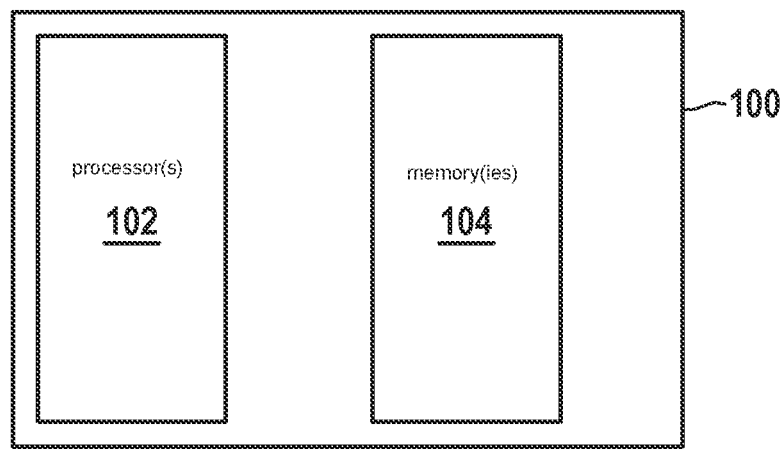
FIG. 1 schematically depicts a device for determining pixels of a synthetic image, according to an example embodiment of the present invention.

FIG. 1 schematically depicts a device 100 for evaluating generative adversarial network controls. The device 100 is configured for determining pixels of a synthetic image. The device 100 comprises at least one processor 102 and at least one memory 104.

The at least one memory 104 is configured to store computer-readable instructions that when executed by the at least one processor 102 cause the device 100 to execute steps of a method, that is described below.

The at least one processor 102 is configured to execute the instructions.

Figure 2:
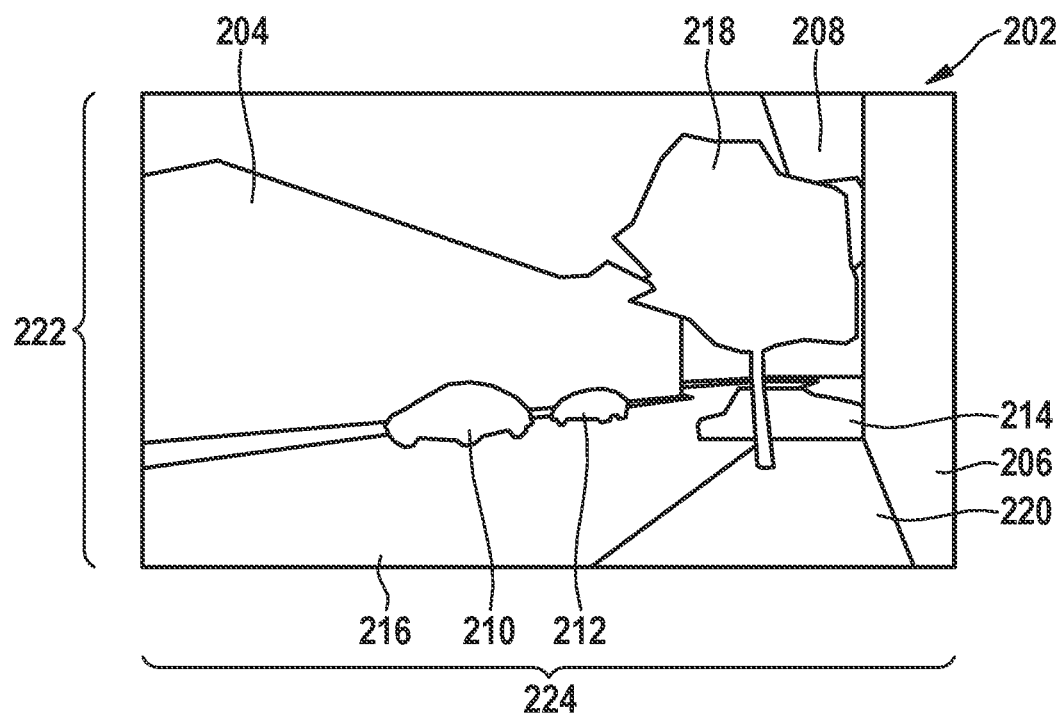
FIG. 2 schematically depicts a digital image.

FIG. 2 schematically depicts a digital image 202. The digital image 202 may be a generated image. The digital image 202 comprises a first building 204, a second building 206, a third building 208, a first car 210, a second car 212, and a third car 314. The first building 204 is located on a left side of the digital image and the second building 206 is located on a right side of the digital image 202. These buildings are located on opposite sides of a road 216 that extends from a lower left corner of the digital image 202 to the third building 208 which is located on an upper right corner of the digital image 202.

The first car 210 is located in the digital image 202 left of the second car 212. The third car 214 is located in the digital image 202 right of the second car 210. The first car 210 and the second car 212 are located closer to the first building 204 than the third car 212.

A tree 218 and a walkway 220 are located in the digital image 202 between the second building 206 and the road 216.

In the example, the digital image 202 has a height 220 and a width 222. The digital image 202 comprises pixels. The digital image 202 for example has a height 220 of H=756 pixel and a width 222 of W=1024 pixels. This exemplary digital image 202 comprises 1024*756=774144 pixel.

Figure 3:
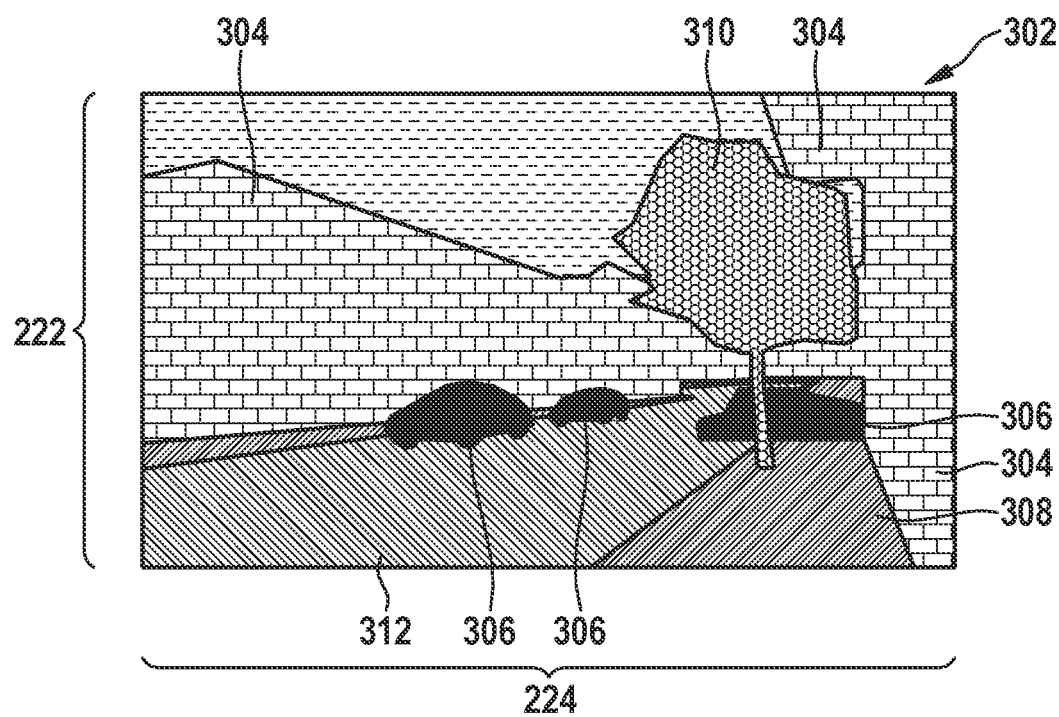
FIG. 3 schematically depicts a label map for the digital image, according to an example embodiment of the present invention.

FIG. 3 schematically depicts a label map 302 for the digital image 202. The label map 302 may have the same dimensions as the digital image 202. The label map 302 comprises a mapping $y \in \mathbb{R}^{H \times W \times C}$ of at least one class $c \in C$ of a plurality of classes C to at least one of the pixels of the digital image 202. In the exemplary label map 302 depicted in FIG. 3, the plurality of classes C comprise a class for building, car, walkway, tree, and street. The plurality of classes C is not limited to comprising these exemplary classes. The plurality of classes C is for example selected from a domain that is suitable for explaining a content of the digital image. The mapping y in the example assigns the pixels of the digital image 202 that represent the first building 204, the second building 206 and the third building 208 a first class 304, building. The mapping y in the example assigns the pixels of the digital image 202 that represent the first car 210, the second car 212 and the third car 214 a second class 306, car. The mapping y in the example assigns the pixels of the digital image 202 that represent the walkway 220 a third class 308, walkway. The mapping y in the example assigns the pixels of the digital image 202 that represent the tree 218 a fourth class 310, tree. The mapping y in the example assigns the pixels of the digital image 202 that represent the street 216 a fifth class 312, street.

The label map 302 may have lower spatial dimensions as the digital image 202. The mapping y may assign a group of pixels to one class in this case.

Figure 4:
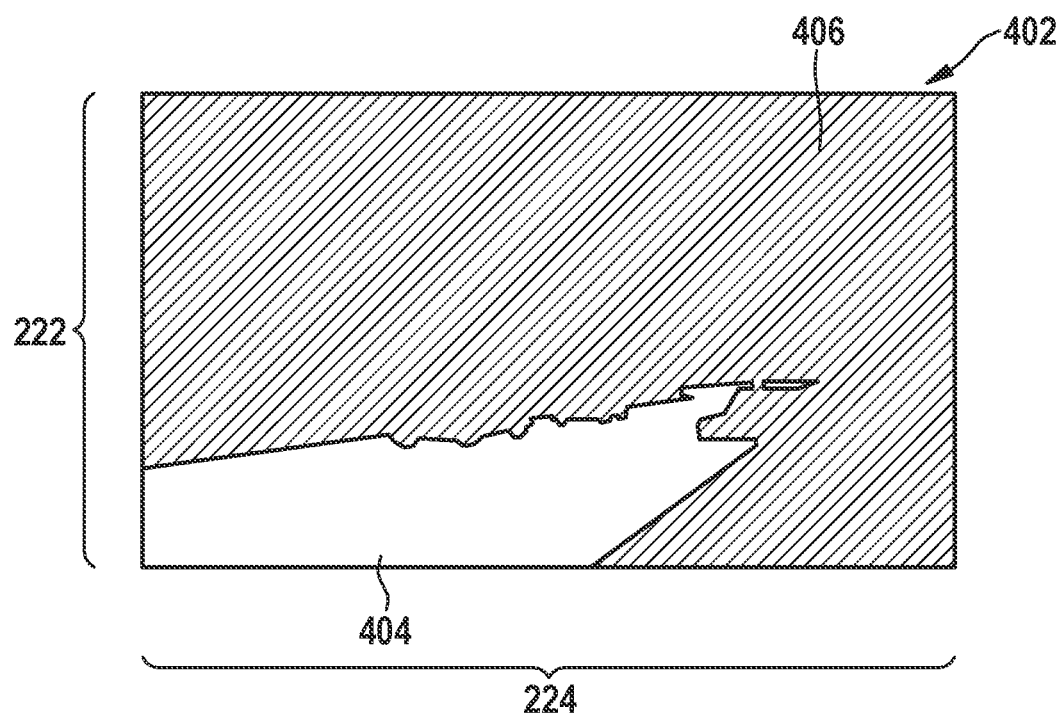
FIG. 4 schematically depicts a class mask for the digital image, according to an example embodiment of the present invention.

FIG. 4 schematically depicts a class mask 402 for the digital image 202. The class mask 402 comprises a mapping $M_c$ of at least one class $c \in C$ to at least one of the pixels of the digital images 202. In the example, the mapping $M_c$ is a binary map that maps a first binary value 404, e.g. One, to the pixels that according to the label map 302 represent the street and that maps a second binary value 406 that is different from the first binary value 404, e.g. Zero, to the pixels that according to the label map 304 represent the other pixels.

The class mask 402 may have the same or lower spatial dimensions as the label map 302. The mapping $M_c$ may assign a group of pixels the same binary value in this case.

Figure 5:
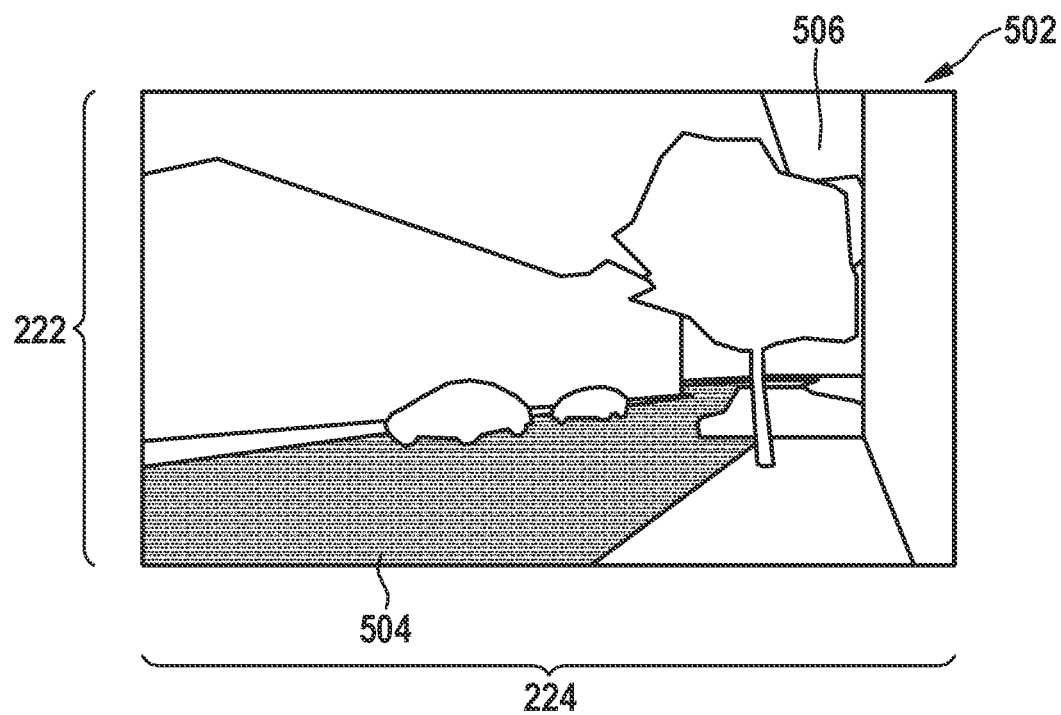
FIG. 5 schematically depicts a first synthetic image, according to an example embodiment of the present invention.

FIG. 5 schematically depicts a first synthetic image 502. The first synthetic image 502 comprises a first set of pixels 504 that correspond to the pixels that represent the street according to the class mask 402 and a second set of pixels 506 that correspond to the other pixels according to the class mask 402.

The synthetic image 502 may have the same special dimensions as the label map 302, the class mask 402 and/or the digital image 202.

In the example, the first set of pixels 504 that represents the street is different in color from the pixels of the digital image 202 that represent the street 216. In the example, the second set of pixels 506 is unchanged compared to the digital image 202.

Figure 6:
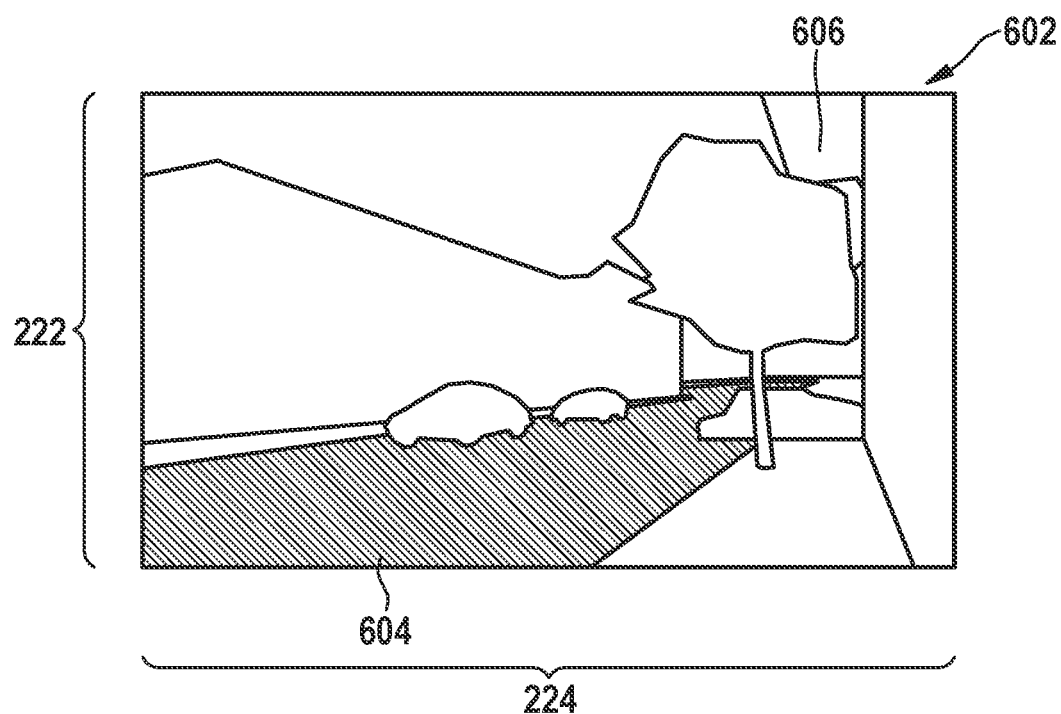
FIG. 6 schematically depicts a second synthetic image, according to an example embodiment of the present invention.

FIG. 6 schematically depicts a second synthetic image 602. The second synthetic image 602 comprises a first set of pixels 604 that correspond to the pixels that represent the street according to the class mask 402 and a second set of pixels 606 that correspond to the other pixels 606 according to the class mask 402.

In the example, the first set of pixels 604 that represents the street is different in color from the pixels of the digital image 202 that represent the street 216 and from the first set of pixels 504 of the first synthetic image 502. In the example, the second set of pixels 606 is unchanged compared to the digital image 202.

Figure 7:
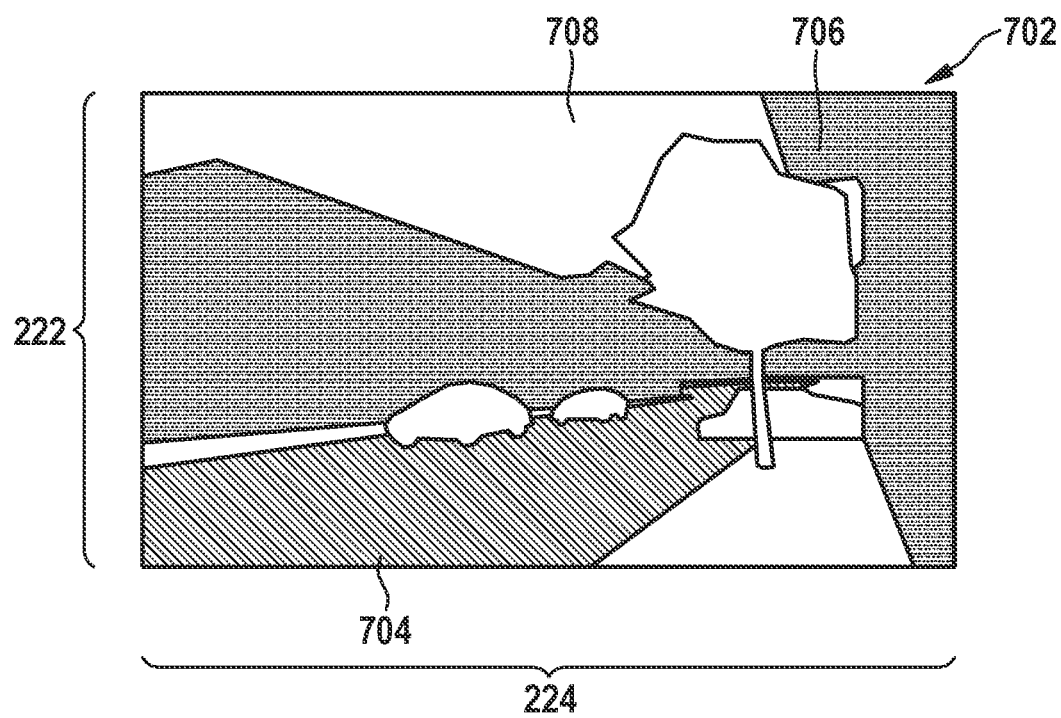
FIG. 7 schematically depicts a third synthetic image, according to an example embodiment of the present invention.

FIG. 7 schematically depicts a third synthetic image 702. The third synthetic image 702 is based on another class mask that comprises a mapping $M_c$ that assigns the first binary value to pixels that according to the label map 302 represent the street or the building. The third synthetic image 702 comprises a first set of pixels 704 that correspond to the pixels that represent the street according to label map 302 and a second set of pixels 706 that corresponds to the pixels that represent the buildings according to the label map 302 and a third set of pixels 708 that correspond to the other pixels according to the label map 302.

In the example, the first set of pixels 704 that represents the street is different in color from the pixels of the digital image 202 that represent the street 216. In the example, the second set of pixels 706 that represents the buildings is different in color from the pixels of the digital image 202 that represent the first building 204, the second building 206 and the third building 308. In the example, the third set of pixels 708 is unchanged compared to the digital image 202.

Figure 8:
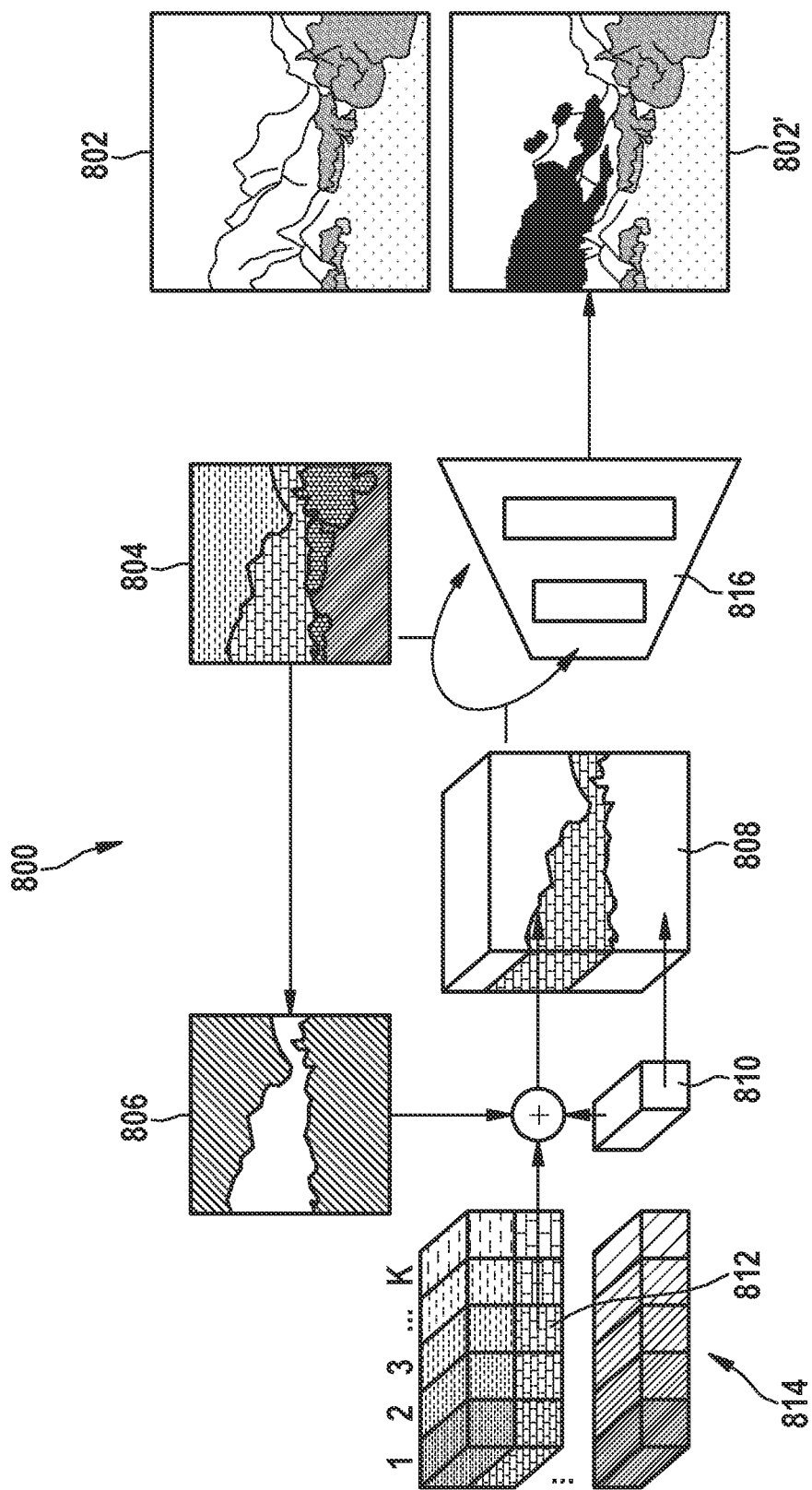
FIG. 8 schematically depicts a process for evaluating generative adversarial network controls, according to an example embodiment of the present invention.

FIG. 8 schematically depicts a process 800 for evaluating generative adversarial network controls. Generative adversarial network controls are an example of a control of a generator for determining pixels of a synthetic image. The process 800 comprises determining pixels of a synthetic image 802'.

The process 800 aims at generating synthetic images 802, 802'. The process 800 comprises providing a label map 804 for the synthetic images 802, 802'. The label map 804 comprises a mapping of at least one class c∈C to at least one of the pixels.

The process 800 comprises providing a class mask 806. The class mask 806 comprises a mapping of at least one class c∈C to at least one of the pixels.

The process 800 comprises providing a latent code 808. The latent code comprises input data points 810 in a latent space. The latent code is for example sampled.

The latent code 808 may be spatially aligned with the class mask 806 and/or the label map 804 and/or the synthetic images 802, 802'. In one example, the class mask 806 is stored in an at least two-dimensional tensor, the latent code 808 is stored in an at least three-dimensional tensor, the label map 804 is stored in an at least three-dimensional tensor and the synthetic image 802 or 802' is stored in an at least three-dimensional tensor. The at least three-dimensional tensor for the synthetic image 802 or 802' in one example has a dimension corresponding to a width of the synthetic image 802 or 802' and a dimension corresponding to a height of the synthetic image 802 or 802'. The width of the synthetic image 802 or 802' may be a given width 222 of the digital image 202. The height of the synthetic image 802 or 802' may be a given height 224 of the digital image 202. Spatially aligned in this context may mean that the tensor for the class mask 806 and/or the label map 804 comprises a dimension of the same size as the dimension corresponding to the width of the synthetic image 802 or 802' and a dimension of the same size as the dimension corresponding to the height of the synthetic image 802 or 802'.

The process 800 comprises providing a direction 812 from a plurality of class specific directions 814 for moving input data points 810 in the latent space. In the example, the plurality of class specific directions 814 comprises K directions for each class c ∈ C. The class mask 806 indicates the input data points 810 to be moved in the first direction 812 for the class c.

The process 800 comprises determining the latent code 808 depending on the input data point 810 that is moved in the direction 812. The process 800 comprises moving the input data point 810 if it is selected for moving by the class mask 806, e.g. in case the first binary value, and otherwise not moving the input data point 810.

The process 800 comprises determining the synthetic image 802 or 802' depending on an output of a generator 816 for an input that comprises the label map 804 and the class mask 806 and the latent code 808. The generator 816 may be a generator of a generative adversarial network. The generator 816 may comprise another neural network, e.g. a diffusion model or a VQ model.

In the example, the generator 816 is a well-trained generator G of a Semantic Image Synthesis, SIS, model. This means, for example, the generator G is configured to synthesize digital images from label maps and latent code.

The generator G for example comprises a neural network. The generator G in this example comprises an input layer and an output layer and at least one intermediate layer l∈L between the input layer and the output layer.

The generator $G=G(z,v_k,y)$ is configured in one example to synthesize the synthetic image globally given a three-dimensional latent code $z \in \mathbb{R}^{H \times W \times D}$ and the label map $y \in \mathbb{R}^{H \times W \times C}$ of a same spatial dimension and with a latent dimension D, a direction $v_k \in \mathbb{R}^{H \times W \times D}$, the binary mask $M_c=1_{[y=c]}$ and an intensity α that controls an intensity of a change:

$$x(v_k)=G(z+\alpha v_k,y)=F(h(z,v_k,y))$$

where $$h(z,v_k,y)=\{G_l(z,y)\}_{l \in L}$$

is the features or a chosen subset of features from the intermediate layers l∈L in the generator $G(z,v_k,y)$. The generator G and the latent code z is not restricted to a three-dimensional latent space. The latent code z may have more than three dimensions.

The generator $G=G(z,v_k^c,y)$ is configured in one example to synthesize the synthetic image locally, given the three-dimensional latent code $z \in \mathbb{R}^{H \times W \times D}$ and the label map $y \in \mathbb{R}^{H \times W \times C}$, a class specific direction $v_k^c \in \mathbb{R}^{H \times W \times D}$, the binary mask $M_c=1_{[y=c]}$ and the intensity α. In one example for a synthetic image $$x(v_k^c)=G(z+\alpha M_c \odot v_k^c,y)=F(h(z,v_k^c,y))$$

To synthesize the synthetic image locally may result in changing only selected pixels, i.e. pixels that are indicated in the $M_c$, compared to a synthetic image that results from synthesizing the synthetic image from the same latent code z without moving part of it in the first direction $v_k^c$.

Figure 9:
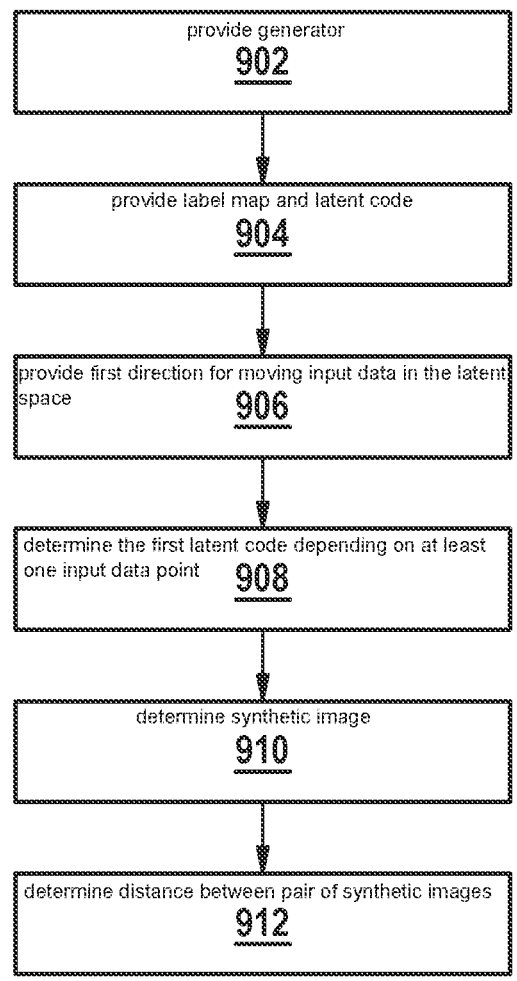
FIG. 9 schematically depicts a method for evaluating generative adversarial network controls, according to an example embodiment of the present invention.

FIG. 9 schematically depicts a method for evaluating generative adversarial network controls. The method finds a diverse set of K directions V={$v_1, \ldots, v_k$}, K>0 that can meaningfully edit an appearance of pixels of the synthetic image x or class specific directions $V^c$={$v_1^c, \ldots, v_k^c$}, K>0 that can meaningfully edit an appearance of pixels of class c in the synthetic image x, such that image $x(v_k^c)$ has a visually distinct appearance of class c compared to the synthetic image x.

This is achieved in one example by a method for discovering latent directions with an optimization objective L. The method for discovering latent directions can be a different one and use a different optimization objective.

In one example, for the whole synthetic image x and the direction $v_k$ that is independent of the class c the optimization objective comprises a diversity loss that depends on an expectancy value $E_{(z,y)}$ $$L_{div} = -E_{(z,y)} \left[ \sum_{\substack{k_{1,2} \\ k_1 \neq k_2}}^{K} \left\| h(z, v_{k_1}, y) - h(z, v_{k_2}, y) \right\|_2 \right]$$

wherein $\| \|_2$ is the L2 Norm.

This means, the expectancy value $E_{(z,y)}$ depends on different pairs of sets of features h that the intermediate layer l outputs.

The optimization objective is to find the set of directions V that maximizes the distances between the different pairs of sets of features that the intermediate layer l outputs for different first inputs. The different first inputs comprise the same label map y and vary by the first direction $v_{k_i}$ that is used for determining the first latent code from the same latent code z.

This loss aims to ensure that the set of found class specific directions V applied to identical input latent code z yields maximally different semantic visual effects, i.e. change an appearance in a different way.

To evaluate the set of directions V in one example comprises determining a diversity score:

$$Div = \frac{1}{\binom{K}{2}} \sum_{\substack{k_{1,2} \\ k_1 \neq k_2}}^{K} d(x(v_{k_1}), x(v_{k_2}))$$

where K is the number of discovered latend directions and d is a distance between two synthetic images $x(v_{k_1})$ and $x(v_{k_2})$, which are generated with the same label map y and latent code z, e.g. input noise, and with different latent directions $v_{k_1}$ and $v_{k_2}$. A high diversity score implies that each discovered latent direction changes an appearance of a generated synthetic image in a uniquely different way.

In one example the distance d is a LPIPS distance. LPIPS distance is described in Zhang, R., Isola, P., Efros, A. A., Shechtman, E., Wang, O.; "The unreasonable effectiveness of deep features as a perceptual metric;" in: Computer Vision and Pattern Recognition (CVPR) (2018).

In one example the distance d is a MS-SSIM distance. MS-SSIM distance is described in Wang, Z., Simoncelli, E. P., Bovik, A. C.; "Multiscale structural similarity for image quality assessment;" in: Asilomar Conference on Signals, Systems & Computers (2003).

To evaluate the class specific set of directions $V^c$ in one example comprises determining a consistency score:

$$Cons = \frac{1}{K} \sum_{k=1}^{K} d(x(z_1, v_k^c), x(z_2, v_k^c))$$

where K is the number of discovered latend directions and d is the distance between two synthetic images $x(z_1,v_k)$ and $x(z_2,v_k)$, which are generated with the same label map y and latent direction, e.g. the first direction $v_k$ and with varying latend code $z_1,z_2$, e.g input noise. A low consistency score implies that each edit introduces consistent changes in the synthetic image.

The distances are summed up for the number of discovered latent directions. In one example, the directions index k is sampled randomly.

The optimization objective comprises in one example a class specific diversity loss that depends on an expectancy value $E_{(z,y)}$ as follows:

$$L_{div} = -E_{(z,y)} \left[ \sum_{\substack{k_{1,2} \\ k_1 \neq k_2}}^{K} M_c \left\| h(z, v_{k_1}^c, y) - h(z, v_{k_2}^c, y) \right\|_2 \right]$$

This means, the expectancy value $E_{(z,y)}$ depends on different pairs of sets of features h that the intermediate layer l outputs for pixels indicated by the class mask $M_c$ to be considered.

The optimization objective is to find the set of directions $V^c$ that maximizes the distances between the different pairs of sets of features that the intermediate layer l outputs for different first inputs. The different first inputs comprise the same label map y and the same class mask $M_c$ and vary by the first direction $v_{k_i}^c$ that is used for determining the first latent code from the same latent code z.

This loss aims to ensure that the set of found class specific directions $V^c$ applied to identical input latent code z yields maximally different semantic visual effects, i.e. change an appearance of class c in a different way.

To evaluate the class specific set of directions $V^c$ in one example comprises determining a class specific diversity score:

$$Div(c) = \frac{1}{\binom{K}{2}} \sum_{\substack{k_{1,2} \\ k_1 \neq k_2}}^{K} M_c \odot d(x(v_{k_1}^c), x(v_{k_2}^c))$$

where K is the number of discovered class specific latent directions and d is the distance between two synthetic images $x(v_{k_1}^c)$ and $x(v_{k_2}^c)$, which are generated with the same label map y and latent code z, e.g input noise, and with different class specific latent directions $v_{k_1}^c$ and $v_{k_2}^c$. A high diversity score implies that each discovered latent direction changes a class appearance of a generated synthetic image in a uniquely different way.

To evaluate the class specific set of directions $V^c$ in one example comprises determining a class specific disentanglement score:

$$Dis(c) = \frac{1}{K}\sum_{k=1}^{K}(1-M_c)\odot d(x, x(v_k^c))$$

wherein d is the distance between a synthetic image x which is generated with the label map y and unmoved latent code z, and a synthetic image $x(v_k^c)$, which is generated with the label map y and latend code z which is moved with a class specific latent direction, e.g. the first direction $v_k^c$.

To evaluate the class specific set of directions $V^c$ in one example comprises determining a class specific consistency score:

$$Cons(c) = \frac{1}{K}\sum_{k=1}^{K}M_c\odot d(x(z_1, v_k^c), x(z_2, v_k^c))$$

where K is the number of discovered class specific latend directions and d is the distance between two synthetic images $x(z_1,v_k^c)$ and $x(z_2,v_k^c)$, which are generated with the same label map y and class specific latent direction, e.g. the first direction $v_k^c$ and with varying latent code $z_1$, $z_2$, e.g input noise. A low consistency score implies that each class edit introduces consistent changes in an area of the synthetic image indicated by the class mask $M_c$.

In one example, for the LPIPS distance, the distance is computed between images in a feature space of the generator as described in Simonyan, K., Zisserman, A.; "Very deep convolutional networks for large-scale image recognition;" arXiv preprint arXiv:1409.1556 (2014) This means, the feature distance is computed in the area of the edited class. The distances are summed up for the number of discovered latent directions. In one example, the directions index k is sampled randomly for the classes in the label map.

The method for evaluating the control for the generator for determining pixels of the synthetic image x comprises a step 902.

In the step 902, the method comprises providing the generator 816, in particular the generator G that is configured to determine its output from a first input.

The method comprises a step 904.

In the step 904 the method comprises providing the label map y and the latent code z.

The latent code z comprises input data points in the latent space.

Optionally, the step 904 comprises providing the class mask $M_c$.

In the example, the class mask $M_c$ is determined depending on the label map y and the class c.

The class mask $M_c$ specifies pixels in the synthetic image that the label map y specifies as pixels of the class c.

The method comprises a step 906.

In the step 906 the method comprises providing the first direction for moving input data points in the latent space.

In one example, the first direction $v_k$ is provided. The first direction $v_k$ is for example selected from a set of directions V.

In one example, the class specific first direction $v_k^c$ is provided. The class specific first direction $v_k^c$ is for example selected for a class c from the class specific set of directions $V^c$.

The method comprises a step 908.

In the step 908 the method comprises determining the first latent code depending on at least one input data point of the latent code z that is moved in the first direction.

The first input in one example comprises the label map y and the first latent code $z+\alpha v_k$.

This means, moving the latent code z or a part of the latent code z in the first direction in particular with a given intensity $\alpha$. This alters the latent code across the pixels independent of the class.

The first input optionally comprises the label map y and the class mask $M_c$ and the first latent code $z+\alpha M_c\odot v_k^c$.

This means, moving a part of the latent code z by selecting the part of the latent code z depending on the class mask c. This alters the latent code z in areas identified by the class mask $M_c$.

The method comprises a step 910.

In the step 910 the method comprises determining the synthetic image depending on an output of the generator for the first input.

In one example, the synthetic image $x(v_k)=G(z+\alpha v_k,y)=F(h(z,v_k,y))$ is determined.

In one example, the synthetic image $x(v_k^c)=G(z+\alpha M_c\odot v_k^c,y)=F(h(z,v_k^c,y))$ is determined.

The method comprises a step 912.

In the step 912, the method comprises determining a distance between at least one pair of synthetic images 802, 802', which are generated by the generator 816 for different first inputs.

The method may comprise determining an average of distances determined for different pairs.

In one example, a mean over these distances is determined.

The different first inputs in one example comprise the label map 804 and vary by the first direction that is selected for determining the first latent code 808 from the latent code z. For example the specific diversity score Div or the class specific diversity score Div(c) is determined for these.

The different first inputs in one example comprise the label map 804 and the class mask 806 and vary by the first direction that is selected for determining the first latent code 808 from the latent code z. For example the class specific disentanglement score Dis(c) is determined for these.

The different first inputs in one example comprise the label map 804 and vary by the first latent code $z_1$, $z_2$ that is determined with the same first direction from varying latent code z. For example, the consistency score Cons or the class specific consistency score Cons(c) is determined for these.

The method may comprise determining distances for at least one class of the classes that the label map comprises and the an average depending on the distances for the at least one class.

The method may use image quality metrics, e.g., as described in Park, T., Liu, M. Y., Wang, T. C., Zhu, J. Y.; "Semantic image synthesis with spatially-adaptive normalization;" in: Computer Vision and Pattern Recognition (CVPR) (2019) and Schönfeld, E., Sushko, V., Zhang, D., Gall, J., Schiele, B., Khoreva, A.; "You only need adversarial supervision for semantic image synthesis;" in: International Conference on Learning Representations (ICLR) (2020); evaluate the overall visual quality of images generated with classspecific edits using the Frechet Inception Distance (FID) as described in Heusel, M., Ramsauer, H., Unterthiner, T., Nessler, B., Hochreiter, S.; "Gans trained by a two time-scale update rule converge to a local nash equilibrium" (2017). FID may be used to evaluate visual quality and fidelity of the generated synthetic image in accordance with human judgement.

The method may use mean Intersection-over-Union to assess an alignment of a generated synthetic image with a ground truth semantic label map, calculated via a pre-trained semantic segmentation network.

For data augmentation, the method may comprise synthesizing a plurality of the synthetic images with the same label map and with different first directions.

For validation, the method may comprise testing a robustness or functionality of an application for processing digital images depending on a plurality of the synthetic images. The validation may comprise synthesizing a plurality of the synthetic images 802, 802' with the same label map and testing a robustness or functionality of an application for processing digital images depending on distances or scores that are determined for the plurality of the synthetic images 802, 802'.

The label map may be determined to emulate a digital image output of an image sensor, in particular a video, radar, LiDAR, ultrasonic, motion or thermal image sensor.

The method may comprise determining a control signal for a computer-controlled machine by a model depending on the synthetic image. The model is in one example trained depending on the synthetic image to determine the control signal.

The computer-controlled machine may be a robot. The robot may be a vehicle or a vehicle for autonomous driving, a domestic appliance, a power tool a manufacturing machine, a personal assistant, a device for automatic optical inspection, or an access system.

The model may comprise an object detector configured for detecting objects in the synthetic image.

The model may comprise a classifier configured for classifying the synthetic image or objects in the synthetic image.

The model may comprise a segmenter, configured for segmenting the synthetic image.

For an image editing application, the method in one example comprises determining the label map from user input detected by a graphical user interface. The synthetic image is for example output by a display, in particular of the graphical user interface.

In this case, a user may draft the label map and then modify the synthesized image using the learnt directions. The user may select the first direction from the set of directions. The synthetic image resulting from moving the latent code with the selected first direction is for example output.

What is claimed is:

1. A computer-implemented method for evaluating a control of a generator for determining pixels of a synthetic image, the generator being configured to determine pixels of the synthetic image from a first input including a label map and a first latent code, wherein the label map includes a mapping of at least one class to at least one of the pixels, the method comprising the following steps:
providing the label map and latent code, wherein the latent code includes input data points in a latent space;
providing the control, wherein the control includes a set of directions for moving the latent code in the latent space;
determining the first latent code depending on at least one input data point of the latent code that is moved in a first direction, wherein the first direction is selected from the set of directions; and
determining a distance between at least one pair of synthetic images, which are generated by the generator for different first inputs, wherein the different first inputs comprise the label map and vary by the first direction that is selected for determining the first latent code from the latent code;
wherein the first input includes a class mask, wherein the class mask indicates the input data points to be moved in the first direction for a class, and the distance is determined depending on pixels of the synthetic images indicated by the class mask to be considered.

2. The method according to claim 1, further comprising: determining the distance between pairs of synthetic images that are generated with the same label map and first direction and with varying latent code.

3. The method according to claim 1, further comprising: determining an average of distances determined for different pairs of synthetic images, the average including a mean over the distances.

4. The method according to claim 3, further comprising: determining distances for at least one class of the classes that the label map includes and the average depends on the distances for the at least one class.

5. The method according claim 1, further comprising: synthesizing a plurality of the synthetic images with the same label map and testing a robustness or functionality of an application for processing digital images depending on distances or scores that are determined for the plurality of the synthetic images.

6. The method according to claim 1, wherein: i) the label map is determined to emulate a digital image output of an image sensor, the image sensor including a video sensor, or a radar sensor, or a LiDAR sensor, or an ultrasonic sensor, or a motion sensor, or a thermal image sensor, wherein a control signal for a computer-controlled machine is determined by a model depending on the synthetic image, the computer-controlled machine including a robot, or a vehicle, or a vehicle for autonomous driving, or a domestic appliance, or a power tool, or a manufacturing machine, or a personal assistant, or a device for automatic optical inspection, or an access system, and that includes an object detector configured to detect objects in the synthetic image, or a classifier configured for classifying the synthetic image or objects in the synthetic image, or a segmenter configured for segmenting the synthetic image, and wherein the model is trained depending on the synthetic image to determine the control signal, and/or ii) the determining of the label map and/or a selected first direction is based on the set of directions from user input detected by a graphical user interface, wherein a synthetic image is determined depending on the label map and/or latent code that is moved in the selected first direction and output by a display of the graphical user interface.

7. A computer-implemented method for evaluating a control of a generator for determining pixels of a synthetic image, the generator being configured to determine pixels of the synthetic image from a first input including a label map and a first latent code, wherein the label map includes a mapping of at least one class to at least one of the pixels, the method comprising the following steps:
providing the label map and latent code, wherein the latent code includes input data points in a latent space;
providing the control, wherein the control includes a set of directions for moving the latent code in the latent space;
determining the first latent code depending on at least one input data point of the latent code that is moved in a first direction, wherein the first direction is selected from the set of directions;

determining a distance between at least one pair of synthetic images, which are generated by the generator for different first inputs, wherein the different first inputs comprise the label map and vary by the first direction that is selected for determining the first latent code from the latent code; and determining the distance between the pairs of a synthetic image which is generated with the label map and unmoved latent code, and a synthetic image which is generated with the label map and the latent code which is moved with the first direction.

8. A device configured to evaluate a control of a generator for determining pixels of a synthetic image, the generator being configured to determine pixels of the synthetic image from a first input including a label map and a first latent code, wherein the label map includes a mapping of at least one class to at least one of the pixels, the device comprising:

at least one processor; and at least one memory, wherein the at least one memory is configured to store computer-readable instructions that when executed by the at least one processor cause the device to perform the following:

providing the label map and latent code, wherein the latent code includes input data points in a latent space, providing the control, wherein the control includes a set of directions for moving the latent code in the latent space, determining the first latent code depending on at least one input data point of the latent code that is moved in a first direction, wherein the first direction is selected from the set of directions, and determining a distance between at least one pair of synthetic images, which are generated by the generator for different first inputs, wherein the different first inputs comprise the label map and vary by the first direction that is selected for determining the first latent code from the latent code, wherein the first input includes a class mask, wherein the class mask indicates the input data points to be moved in the first direction for a class, and the distance is determined depending on pixels of the synthetic images indicated by the class mask to be considered.

9. A non-transitory computer-readable storage medium on which is stored a computer program for evaluating a control of a generator for determining pixels of a synthetic image, the generator being configured to determine pixels of the synthetic image from a first input including a label map and a first latent code, wherein the label map includes a mapping of at least one class to at least one of the pixels, the computer program, when executed by a computer, causing the computer to perform the following steps:

providing the label map and latent code, wherein the latent code includes input data points in a latent space;

providing the control, wherein the control includes a set of directions for moving the latent code in the latent space;

determining the first latent code depending on at least one input data point of the latent code that is moved in a first direction, wherein the first direction is selected from the set of directions; and determining a distance between at least one pair of synthetic images, which are generated by the generator for different first inputs, wherein the different first inputs comprise the label map and vary by the first direction that is selected for determining the first latent code from the latent code;

wherein the first input includes a class mask, wherein the class mask indicates the input data points to be moved in the first direction for a class, and the distance is determined depending on pixels of the synthetic images indicated by the class mask to be considered.

* * * * *